United States Patent [19]

Bollinger et al.

[11] Patent Number: 4,543,138

[45] Date of Patent: Sep. 24, 1985

[54] CAPSULE-SEALING METHOD AND APPARATUS

[75] Inventors: David E. Bollinger, Greenwood; Samuel L. McCormick, Indianapolis, both of Ind.

[73] Assignee: Eli Lilly & Company, Indianapolis, Ind.

[21] Appl. No.: 511,553

[22] Filed: Jul. 7, 1983

[51] Int. Cl.[4] .............................................. B29C 27/02

[52] U.S. Cl. ........................................ 156/69; 118/50; 118/58; 156/285; 156/294; 156/382; 206/530; 206/807; 206/828; 427/3; 428/916

[58] Field of Search ....................... 118/50, 58; 156/69, 156/381, 382, 294, 285, 287; 206/528, 530, 807, 828; 422/26; 427/2, 3, 377, 378; 428/916; 53/471, 478

[56] References Cited

U.S. PATENT DOCUMENTS

| | | | |
|---|---|---|---|
| 1,861,047 | 5/1932 | Colton . | |
| 2,738,827 | 3/1956 | Roll . | |
| 2,940,234 | 6/1960 | Greer | 53/285 |
| 3,073,087 | 1/1963 | Sandhage et al. . | |
| 3,078,629 | 2/1963 | Besemer et al. . | |
| 3,173,840 | 3/1965 | Hostetler et al. . | |
| 3,200,556 | 8/1965 | Ackley . | |
| 3,444,290 | 5/1969 | Wai | 206/528 X |
| 3,466,842 | 9/1969 | Bailey . | |
| 4,196,565 | 4/1980 | Bodenmann et al. | 53/471 |
| 4,225,555 | 9/1980 | Fahlvik et al. | 422/26 X |
| 4,325,761 | 4/1982 | Pace | 156/69 |

OTHER PUBLICATIONS

R. A. Lyman, *American Pharmacy*, 1948, p. 458.

W. J. Husa, *Pharmaceutical Dispensing*, 1947, pp. 70, 72, 73.

E. W. Martin, E. F. Cook, *Remington's Practice of Pharmacy*, 1956, p. 392.

*Primary Examiner*—Robert A. Dawson

*Attorney, Agent, or Firm*—Barnes & Thornburg

[57] ABSTRACT

A capsule-sealing apparatus for use in conjunction with capsule-filling equipment is disclosed which seals a two-piece ingestable capsule. The sealing apparatus includes a chamber having nozzles for dispensing the contents of the chamber, the chamber being supplied with hot, moist air of controlled consistency, preferably being achieved by mixing a supply of steam and air in appropriate proportions. The average pressure of the chamber is maintained slightly below that of the ambient atmosphere which acts to prevent the hot, moist air from leaving the chamber through the nozzles. Apparatus is provided for causing a momentary increase in the pressure within the chamber, which increase delivers the hot, moist air from the chamber through the nozzles into cap members adjacent thereto. The caps thereafter telescopically receive a filled body member of the gelatin capsule, a bond forming between the cap member and body member of the capsule upon their being joined.

23 Claims, 3 Drawing Figures

CAPSULE-SEALING METHOD AND APPARATUS

This invention relates generally to methods and apparatus for sealing two-piece gelatin ingestable capsules, and more particularly to methods and means for sealing said capsules during a conventional capsule-filling operation.

The pharmaceutical industry has employed two-piece gelatin capsules for the packaging and dispensing of medicaments in accurately controlled dosages. The capsules commonly employed comprise a pair of cup-shaped members having substantially cylindrical sides and sized to be telescopically and snugly receivable one into the other. Conventionally, the member fitting on the outside of the pair is referred to as the cap while the member received within the cap is referred to as the body. The capsule members are themselves typically fabricated from water-soluble gelatin.

During a conventional filling operation, the body member is filled with an appropriate pre-measured amount of a medicament typically in the form of small granules or powder. A plurality of the filled body members are situated below but immediately adjacent to a similar number of downwardly opening cap members. The cap members are typically held in position by means of a plate having a plurality of holes, each hole containing a cap member and supporting the same on an annular ridge or step within each hole. The cap and body members are then joined together by the body members being caused to move vertically into the holes to a point that they are telescopically received within the cap member.

The body members and cap members are desirably formed with sufficient dimensional regularity that the two members, when joined together, are sufficiently snug that the two do not separate during normal handling. It has long been recognized, however, that the frictional engagement between the two conventionally formed capsule members is generally insufficient to prevent the capsule from being physically taken apart or, on occasion, falling apart as a result of improper handling. A number of means has been suggested for sealing the two capsule members together so as to prevent the separation of the two parts.

It has been suggested that the capsule members be sealed by means of the application of heat, either through the physical contact of a rod or jaw which would act on the overlapping portion of the body member and cap member, or alternatively, the capsule might be subjected to ultrasonic energy to weld the cup and cap together. While such methods might be employable in certain situations, some types of filling materials, including some medicaments, are adversely affected by the application of heat, thus rendering this procedure undesirable. Moreover, this procedure generally requires individual handling of each capsule which is thought to be inconsistent with large quantity production procedures typically employed in the industry.

Some attempts have been made to apply a liquid agent on the outside of the capsule after the two members have been joined. If the liquid agent is sufficiently viscous, it may appear as a band visible at the junction of the body and cap. Alternatively, the liquid agent may have a sufficiently low viscosity so as to be dispersed by capillarity between the mating surfaces of the body and cap. While this treatment avoids any exposure of the contained material to heat, it still generally requires individual capsule handling.

Some provisions have been made for mechanical interlocks between the capsule members. While mechanical interlocking schemes have enjoyed some degree of success, to prevent separation during normal handling, tampering with capsule contents is easily achieved despite the mechanical interlock.

Pharmaceutical literature has suggested the hand application of water with a brush or rod to the inside surface of the cap prior to assembly with the body member. This basic method was improved upon by Besemer et al in U.S. Pat. No. 3,078,629 which discloses the application of liquid to the inside surface of the cap member through upwardly projecting nozzles which are temporarily situated within the cap member prior to its being joined to the filled body member. The nozzles have lateral openings to direct the liquid to be applied to only the side portions of the cap member. The liquid is forced through the nozzle by means of a piston pump or the like fed from a reservoir of the liquid.

While the Besemer method is a clear improvement on the prior art in that it permits the sealing of a plurality of capsules simultaneously, the presence of the liquid reservoir and the complexity of the liquid pumping mechanisms is thought to be undesirable. Further, the quantity of liquid needed to be dispensed to soften the lower perimetral portion of the cap sufficient to form a seal with the body member when telescopically received is rather small and the handling of such small quantities of liquid by means of the apparatus disclosed by Besemer is at best difficult. Further, Besemer does not disclose any means for heating the liquid within the reservoir in absence of which it is believed that the softening would occur so slowly as to be of no practical commercial value.

In accordance with the present invention, a sealing apparatus for use with conventional filling equipment comprises a chamber having nozzle means for dispensing the contents of the chamber. A supply means supplies the chamber with hot, moist air of a controlled consistency. A regulating means maintains the average pressure of the chamber slightly below that of the ambient atmosphere, thereby inhibiting the hot, moist air within the chamber from migrating out the nozzle means. A control means is provided for causing a momentary increase in the pressure within the chamber to deliver the hot moist air from the chamber through the nozzle means into cap members positioned immediately adjacent to the nozzle means.

The consistency of the hot, moist air is controlled by providing the supply means with a regulated supply of steam and a regulated supply of air and mixing the two. The consistency of the hot, moist air is controlled at a temperature sufficient to disrupt any film of grease existing on the interior surface of the cap member to a point that the moisture in the hot, moist air can act on the gellatin forming the cap member. The moisture content of the hot, moist air must be that which is sufficient to soften the internal surface of the cap member to a point that, when subsequently joined with the filled body member, will form a union or bond between the two capsule members. The temperature of the hot, moist air should be at least about 50° C. and is preferably about 86° C. The moisture level of the hot, moist air at least about saturated and preferably slightly supersaturated. This mixture of hot, moist air at the desired temperature and moisture level can be achieved by supplying the reservoir with steam and air in a ratio of about 0.8 pounds of steam for each pound of air at atmospheric pressure.

The hot, moist air, when dispensed from the nozzle means, projects upwardly into the inverted cap member. The upwardly projected hot, moist air breaks the grease film on the inside surface of the cap member, to permit the moisture content of the hot, moist air to soften the gelatin forming the capsule. If the temperature and moisture level of the hot, moist air are too high, the gelatin forming the cap member may be softened to a point as to no longer retain its structural integrity upon insertion of the body member, thus destroying the capsule.

Various apparatus can be employed to practice the general methods of the present invention. One feature of the present invention is the use of a mixture of steam and air, the proportions of which can be adjusted to achieve optimum softening characteristics based both on temperature and moisture level. Advantages of the present invention are to be found in the simultaneous treatment of a plurality of capsule caps in the very minimum of time under conditions which do not detract from the purity or efficacy of the medicament enclosed in the capsule.

Additional features and advantages of the invention will become apparent to those skilled in the art upon consideration of the following detailed description of a preferred embodiment exemplifying the best mode of carrying out the invention as presently perceived. The detailed description particularly refers to the accompanying figures in which.

Figure 1:
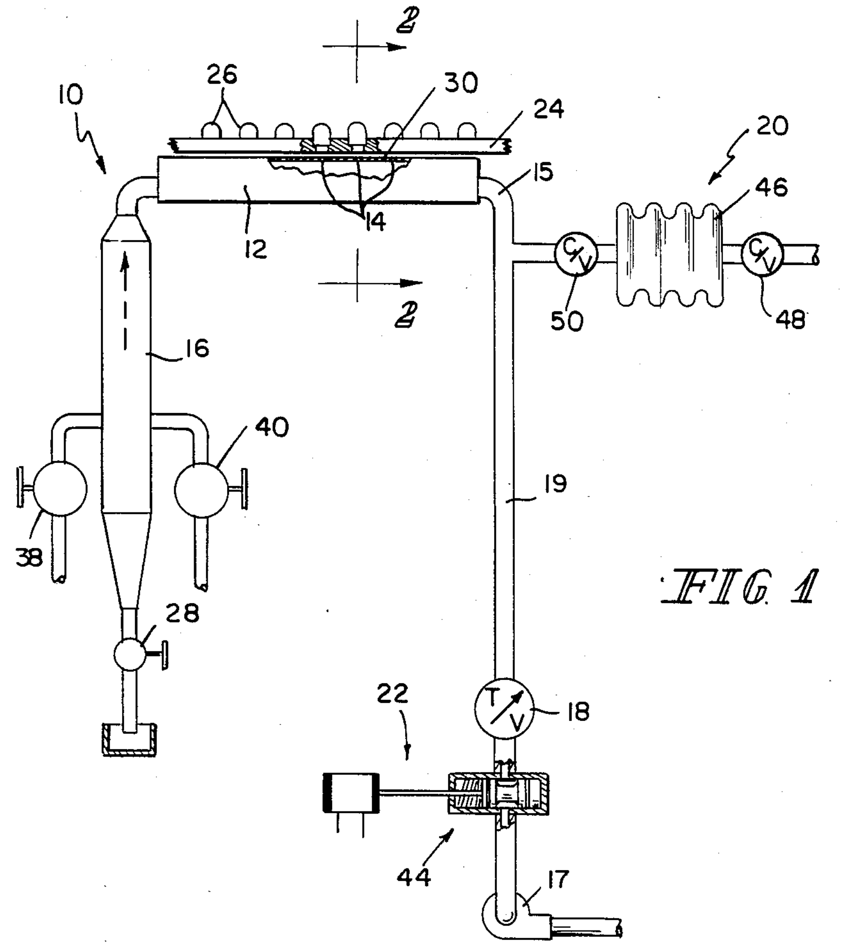
FIG. 1 is a diagrammatic elevational view, partially broken away, of an apparatus for carrying out the present invention.

An apparatus 10 in accordance with the present invention for sealing a two-piece ingestable capsule is diagrammatically shown in FIG. 1 to comprise a chamber or manifold 12 having nozzle means 14 for dispensing the contents of the chamber and a supply means 16 for supplying hot, moist air of a controlled consistency to the chamber 12. An exhaust means 17 is connected to an exhaust outlet 15 of the manifold 12 by way of conduit 19 to provide a continuous flow of the hot, moist air from the supply means 16 through the manifold 12. The exhaust means 17 includes a regulating means 18 such as a throttle valve for maintaining the average pressure within the manifold slightly below that of the ambient atmosphere so as to prevent migration of the hot, moist air out the open nozzle means 14. A control means 20 or 22 is provided for causing a momentary increase in the pressure within the chamber so as to deliver the hot moist air from the chamber through the nozzle means 14 into cap members adjacent thereto. Positioning means 24 can be provided for positioning the cap members 26 adjacent to the nozzle means 14.

The chamber or manifold 12 includes an upper plate 30, the nozzle means 14 being situated in the upper plate 30 in regularly spaced locations which correspond to apertures in the positioning means 24 holding the cap members 26.

The supply means 16 is supplied by a regulated supply of steam 38 and a regulated supply of clean air 40. The steam and clean air are mixed within the supply chamber 16, the steam acting to both moisten and heat the air to a hot, moist condition. The heating of the air by the steam causes some of the steam to condense, and the water condensate is permitted to leave through condensate valve 28.

The control means 20 and 22 generally comprises means for momentarily increasing the pressure within chamber or manifold 12 to such a point that an appropriate quantity of the hot, moist air is ejected outward through the nozzle means 14 into the adjacent cup members 26. The control means can comprise a valve means 44 controlled by a solenoid which momentarily restricts the access of the exhaust means 17 such as a blower fan to the lower portion of conduit 19. This momentary restricting of access of the exhaust means 17 to chamber or manifold 12 causes an increase of pressure within the chamber due to the continuous introduction of hot, moist air from the supply means 16.

The control means can also comprise an apparatus 20 for injecting a momentary pulse of air into chamber 12. The apparatus 20 can consist of a set of bellows 46 with inlet and outlet check valves 48 and 50. The injection of the air by bellows 46 preferably takes place near the outlet 15 of the manifold 12 so as to not significantly adversely affect the temperature and moisture level of the hot, moist air flowing through the chamber or manifold 12. The bellows 46 can be activated in a quick short burst which causes an increase in pressure having a very fast rise time, which in turn causes a very quick momentary upward projection of hot, moist air from manifold 12 through nozzles 14 into the inverted caps 26. The duration and stroke length of the compression of bellows 46 can be regulated and the total volume of the apparatus 10 selected so as to ensure optimum delivery of the hot, moist air into the inverted caps 26. Subsequent to the delivery, to the extent that any air from the bellows exists in the conduit 19, it will quickly be withdrawn by the exhaust means 17 as the chamber 12 is continuously supplied by hot, moist air from the supply means 16.

Figure 2:
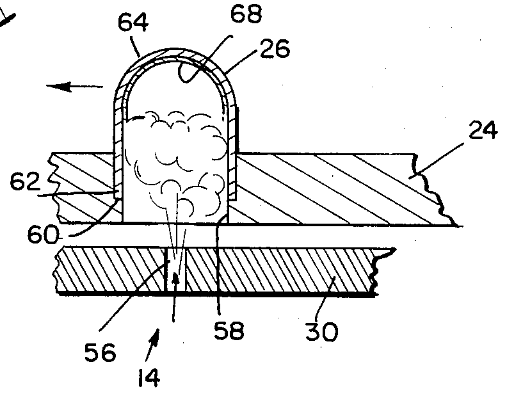
FIG. 2 is a sectional detail of FIG. 1 taken along lines 2—2.

As is shown in more detail in FIG. 2, the top plate 30 of manifold 12 contains a number of apertures 56 therethrough defining the pathway of nozzle 14. The positioning means 24 is shown to comprise a plate having holes 58 which include a circular step or ridge 60 on which the lowermost edge 62 of cap 26 is positioned. The cap 26 is shown to comprise generally an inverted dome 64 having a lower cylindrical portion contiguous to the dome 64, the lowermost edge 62 of cylindrical portion resting on step 60. The cap 26 typically includes an internal coating 68 of grease which is a lubricant conventionally applied to the capsule-forming pins during the manufacture of the capsule members. This lubricating grease 68 may form a water vapor resistant barrier on the inside surface of the cap at room temperature. As the temperature increases, this film 68 becomes increasingly permeable to water vapor. The softening of the gelatin forming the cap is a function of exposure time as well as temperature. Commercially practical uses require that the exposure be limited to less than 10 seconds and preferably to less than about one second. The temperature of the hot, moist air should be at least about 50° C. to achieve the desired results within the commercially practical time limits. A temperature of about 86° C. is preferred in order to achieve the desired intimate contact of the moisture with the gelatin forming the cap 26 where the permissible exposure time is about 0.25 second.

Figure 3:
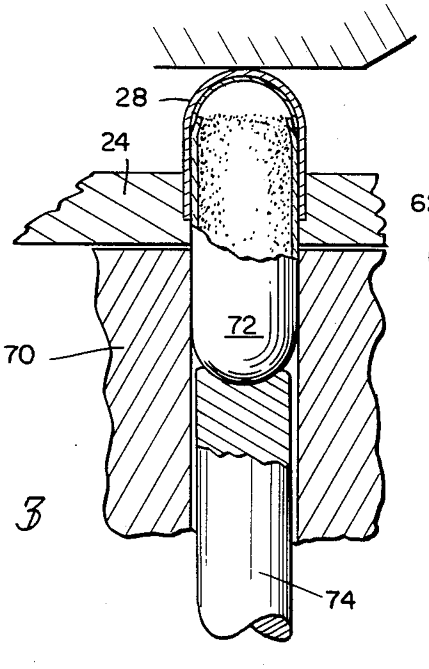
FIG. 3 is a further sectional detail showing assembly of a filled capsule subsequent to the treatment in accordance with the present invention.

After the hot, moist air has been applied to the gelatin cap 26, the positioning means 24 moves the cap 26 to a station as shown generally in FIG. 3 where a member 70 carrying a filled capsule body 72 is aligned with the cap member 26. The body member 72 is then telescopically inserted into the open lower end of cap 26 by means of push rod 74 acting on the lower end of body member 72. The process step illustrated in FIG. 3 follows sequentially after the step shown in FIG. 2 within a time span sufficiently short as to ensure that the inside lower surface of cap member 26 is still sufficiently soft so as to form a bond or union with the outer upper surface of body member 72, thereby sealing the capsule.

Although the invention has been described in detail with reference to certain preferred embodiments, variations and modifications exist within the scope and spirit of the invention as described and as defined in the following claims.

What is claimed is:

1. An apparatus for sealing a two-piece ingestable capsule consisting essentially of a body member telescopically received into a cap member, the apparatus comprising a chamber having nozzle means for dispensing the contents of the chamber, supply means for supplying hot, moist air of a controlled consistency to the chamber, regulating means for regulating the average pressure within the chamber such that said average pressure is slightly below that of the ambient atmosphere, positioning means for positioning a cap member adjacent to the nozzle means, and control means for controlling the flow of the moist air from the chamber through the nozzle means into an adjacent cap member by momentarily increasing the pressure within the chamber.

2. The apparatus of claim 1 wherein the nozzle means comprises a manifold having a plurality of outlets, and wherein the positioning means comprises a plate member having at least a like plurality of stepped apertures, each aperture receiving a cap member with the lower edge thereof being supported upon the step of the aperture.

3. The apparatus of claim 1 wherein the supply means comprises a supply of steam, a supply of air, and means for mixing the steam and air to achieve the hot, moist air of controlled consistency.

4. The apparatus of claim 1 wherein the control means comprises means for injecting a momentary pulse of air into the chamber such that the pressure in the chamber is raised from its average, below ambient atmospheric level to a momentary higher level slightly above ambient atmospheric pressure.

5. The apparatus of claim 1 wherein the control means comprises valve means for restricting access of the regulating means to the chamber.

6. The apparatus of claim 1 wherein the control means comprises means for injecting a momentary pulse of air into the chamber.

7. An apparatus for sealing a two-piece ingestable capsule consisting essentially of a body member telescopically received into a cap member, the apparatus comprising a chamber having nozzle means for dispensing the contents of the chamber, supply means for supplying hot, moist air of a controlled consistency to the chamber, regulating means for maintaining the average pressure of the chamber slightly below that of the ambient atmosphere, and control means for causing a momentary increase in the pressure within the chamber to deliver the hot, moist air from the chamber through the nozzle means into a cap member adjacent thereto.

8. The apparatus of claim 7 wherein the supply means comprises a regulated supply of steam, a regulated supply of air, and means for mixing the steam and air to achieve the hot, moist air of controlled consistency.

9. The apparatus of claim 7 wherein the control means comprises means for injecting a momentary pulse of air into the chamber such that the pressure in the chamber is raised from its average, below ambient atmospheric level to momentary higher level slightly above the ambient atmospheric pressure.

10. A method for sealing a two-piece ingestable capsule consisting essentially of a body member telescopically received into a cap member, the method comprising the steps of providing a chamber having a nozzle means for dispensing the contents of the chamber, supplying the chamber with hot, moist air of controlled consistency, regulating the pressure of the chamber that the average pressure is slightly below that of the ambient atmosphere, positioning a cap member adjacent the nozzle means, injecting a quantity of the hot, moist air into the cap member to prepare the interior surface thereof, and telescoping a body member into the cap member a distance sufficient to form a sealed capsule.

11. The method of claim 10 wherein the hot, moist air is at a temperature sufficient to disrupt a film of grease existing on the interior surface of the cap member to a point that the moisture in the hot, moist air can act on the cap member.

12. The method of claim 11 wherein the moisture content of the hot, moist air is sufficient to soften the internal surface of the cap member to the point that, when subsequently joined with the body member, a bond will form between the body member and cap member.

13. A method of sealing an ingestable gelatin capsule consisting essentially of a body member telescopically received within a cap member, the cap member having an internal coating of a lubricant, the method comprising the steps of positioning a cap member adjacent a dispensing outlet of a reservoir, supplying the reservoir with a controlled mixture of steam and air at a selected temperature and moisture content, regulating the pressure of the reservoir such that the average pressure is slightly below that of the ambient atmosphere, injecting the mixture of steam and air into the cap member in a quantity sufficient to disrupt the lubricant coating and soften the gelatin of at least a lower portion of the cap member, and mating the cap member and body member to form a sealed capsule, the softened lower portion of the cap member bonding to contiguous portions of the body member.

14. The method of claim 13 wherein the controlled mixture of steam and air is at a temperature of at least about 50° C. a moisture content sufficient to soften the gelatin.

15. The method of claim 14 wherein the controlled mixture of steam and air is at a temperature of about 86° C.

16. The method of claim 14 wherein the controlled mixture of steam and air is at least at a saturated moisture level.

17. The method of claim 13 wherein the steam and air are supplied to the reservoir in the ratio of about 0.8 pounds of steam for each pound of air, the average pressure within the reservoir being maintained at or below atomspheric pressure.

18. A method of supplying hot moist air for sealing a two-piece ingestable gelatin capsule consisting essentially of a body member telescopically received into a cap member, the method comprising the steps of supplying a source of air to be injected into the cap member, mixing the air with steam to produce a hot moist air sufficient to soften the gelatin forming the cap, and flowing the hot moist air at slightly less than ambient atmospheric pressure through a manifold having a flow outlet and at least one dispensing outlet therein.

19. The method of claim 21 further comprising the step of injecting a momentary pulse of air near the flow outlet of the manifold to cause said hot moist air to be dispensed through the at least one dispensing outlet.

20. The method of claim 19 wherein the momentary pulse of air lasts about 0.25 second.

21. The method of claim 18 wherein the hot moist air is about saturated with moisture and is at a temperture of at lest about 50° C.

22. Apparatus for sealing a two-piece ingestable capsule consisting essentially of a cap member and a body member telescopically received therein, the apparatus comprising:

a manifold having a flow outlet and at least one dispensing outlet, means for supplying a source of air to be injected into the cap member, means for mixing the air with steam to produce a hot moist air sufficient to soften the gelatin forming the cap, and means for flowing said hot moist air through the manifold at slightly less than ambient atmospheric pressure.

23. The apparatus of claim 22 further comprising means for injecting a momentary pulse of air near said flow outlet of the manifold to cause said hot moist air to be dispensed through the at least one dispensing outlet of the manifold.

* * * * *

UNITED STATES PATENT AND TRADEMARK OFFICE

CERTIFICATE OF CORRECTION

PATENT NO. : 4,543,138

DATED : September 24, 1985

INVENTOR(S) : David E. Bollinger and Samuel L. McCormick

It is certified that error appears in the above-identified patent and that said Letters Patent is hereby corrected as shown below:

Column 2, line 65, after "air", insert --is--.

Column 4, line 51, before "cylindrical", insert --the--.

Column 6, line 32 (claim 10), after "chamber", insert --such--.

Column 7, line 7 (claim 14), after "50° C.", insert --and--.

Column 8, line 3 (claim 19), change "21" to --18--.

Signed and Sealed this

*First* Day of *July 1986*

[SEAL]

*Attest:*

DONALD J. QUIGG

*Attesting Officer* *Commissioner of Patents and Trademarks*